(12) United States Patent
Wang et al.

(10) Patent No.: US 10,164,791 B2
(45) Date of Patent: Dec. 25, 2018

(54) ELECTRICAL CONNECTOR HAVING METALLIC BRACKET ACCOMMODATING PRE-ASSEMBLED METALLIC PLATE AND UPPER AND LOWER TERMINAL MODULES

(71) Applicant: FOXCONN INTERCONNECT TECHNOLOGY LIMITED, Grand Cayman (KY)

(72) Inventors: Yong-Qi Wang, Huaian (CN); Tao Yao, Huaian (CN)

(73) Assignee: FOXCONN INTERCONNECT TECHNOLOGY LIMITED, Grand Cayman (KY)

(*) Notice: Subject to any disclaimer, the term of this patent is extended or adjusted under 35 U.S.C. 154(b) by 0 days.

(21) Appl. No.: 15/494,563

(22) Filed: Apr. 24, 2017

(65) Prior Publication Data

US 2017/0310501 A1 Oct. 26, 2017

(30) Foreign Application Priority Data

Apr. 22, 2016 (CN) .......................... 2016 1 0252913

(51) Int. Cl.
| | |
|---|---|
| *H04L 12/40* | (2006.01) |
| *H01R 12/70* | (2011.01) |
| *H01R 13/516* | (2006.01) |
| *H01R 13/631* | (2006.01) |
| *H01R 13/642* | (2006.01) |

(Continued)

(52) U.S. Cl.
CPC ... *H04L 12/40013* (2013.01); *H01R 12/7023* (2013.01); *H01R 13/516* (2013.01); *H01R 13/631* (2013.01); *H01R 13/642* (2013.01); *H01R 13/6585* (2013.01); *H01R 13/6594* (2013.01); *H01R 24/60* (2013.01); *H04B 1/034* (2013.01); *H01R 12/7005* (2013.01); *H01R 13/504* (2013.01)

(58) Field of Classification Search
CPC .......................... H04L 12/40013; H01R 24/60
USPC ..................................... 439/601.37
See application file for complete search history.

(56) References Cited

U.S. PATENT DOCUMENTS

| 4,824,383 A * | 4/1989 | Lemke .................. H01R 24/60 439/108 |
| 7,758,379 B2 * | 7/2010 | Chen .................. H01R 13/6485 439/607.11 |

(Continued)

FOREIGN PATENT DOCUMENTS

| CN | 103986000 A | 8/2014 |
| CN | 203859275 | 10/2014 |

(Continued)

*Primary Examiner* — Tulsidas C Patel
*Assistant Examiner* — Peter G Leigh
(74) *Attorney, Agent, or Firm* — Wei Te Chung; Ming Chieh Chang

(57) ABSTRACT

An electrical connector includes: an upper and lower terminal modules each including plural terminals; a metallic plate secured between the upper and lower modules; a metallic bracket accommodating the secured metallic plate and upper and lower terminal modules; and an insulative body insert-molding the metallic bracket with the secured metallic plate and upper and lower terminal modules to form a tongue exposing the terminals of each of the upper and lower terminal modules. The metallic bracket contacts the metallic plate and borders the tongue.

20 Claims, 15 Drawing Sheets

(51) Int. Cl.
*H01R 13/6585* (2011.01)
*H01R 24/60* (2011.01)
*H04B 1/034* (2006.01)
*H01R 13/6594* (2011.01)
*H01R 13/504* (2006.01)

(56) References Cited

U.S. PATENT DOCUMENTS

| | | | |
|---|---|---|---|
| 8,461,465 B2 | 6/2013 | Golko et al. | |
| 8,573,995 B2 | 11/2013 | Golko et al. | |
| 8,851,927 B2* | 10/2014 | Hsu | H01R 12/724 439/607.11 |
| 9,178,319 B2* | 11/2015 | Little | H01R 13/6585 |
| 9,231,356 B1* | 1/2016 | Ju | H01R 24/78 |
| 9,281,582 B2* | 3/2016 | Hou | H01R 12/707 |
| 9,306,336 B2* | 4/2016 | Chang | H01R 13/6471 |
| 9,337,588 B2* | 5/2016 | Chang | H01R 13/6594 |
| 9,444,177 B2 | 9/2016 | Tsai et al. | |
| 9,484,662 B2* | 11/2016 | Guo | H01R 13/504 |
| 9,954,317 B2* | 4/2018 | Zhao | H01R 12/58 |
| 9,985,393 B2* | 5/2018 | Zhao | H01R 12/58 |
| 2001/0014554 A1* | 8/2001 | Yoshimura | H01R 13/2442 439/607.22 |
| 2015/0126069 A1* | 5/2015 | Little | H01R 24/60 439/607.55 |
| 2015/0162701 A1 | 6/2015 | Wu et al. | |
| 2015/0171573 A1* | 6/2015 | Little | H01R 24/60 439/607.34 |
| 2015/0194770 A1* | 7/2015 | Little | H01R 13/6582 439/607.27 |
| 2015/0200504 A1* | 7/2015 | Little | H01R 24/60 439/345 |
| 2015/0229063 A1* | 8/2015 | Hsu | H05K 7/1061 439/136 |
| 2015/0229077 A1* | 8/2015 | Little | H01R 12/724 439/78 |
| 2015/0244110 A1* | 8/2015 | Ju | H01R 13/6585 439/607.01 |
| 2015/0263465 A1* | 9/2015 | Zhang | H01R 13/6581 439/676 |
| 2016/0036169 A1* | 2/2016 | Hu | H01R 13/6585 439/607.05 |
| 2016/0056586 A1* | 2/2016 | Guo | H01R 13/41 439/607.05 |
| 2016/0064866 A1* | 3/2016 | Kao | H01R 13/6461 439/676 |
| 2016/0093970 A1 | 3/2016 | Wu et al. | |
| 2016/0111821 A1* | 4/2016 | Lan | H01R 13/646 439/607.01 |
| 2016/0118752 A1* | 4/2016 | Guo | H01R 13/6585 439/78 |
| 2016/0141804 A1* | 5/2016 | Kao | H01R 24/60 439/607.01 |
| 2016/0141806 A1* | 5/2016 | Guo | H01R 13/504 439/607.01 |

FOREIGN PATENT DOCUMENTS

| | | |
|---|---|---|
| CN | 204243365 U | 4/2015 |
| CN | 204315771 | 5/2015 |
| CN | 204706693 U | 10/2015 |
| CN | 105449443 A | 3/2016 |
| TW | M476384 | 4/2014 |
| TW | M502976 | 6/2015 |
| TW | M506393 | 8/2015 |

* cited by examiner

ELECTRICAL CONNECTOR HAVING METALLIC BRACKET ACCOMMODATING PRE-ASSEMBLED METALLIC PLATE AND UPPER AND LOWER TERMINAL MODULES

BACKGROUND OF THE INVENTION

1. Field of the Invention

The present invention relates to a dual orientation electrical connector having separately fabricated metal sheet and metal bracket in contact with each other.

2. Description of Related Arts

U.S. Pat. No. 8,461,465, issued on Jun. 11, 2013, discloses a dual orientation connector manufactured by constructing a flex circuit, attaching contact pucks to the flex circuit, and attaching the flex circuit to a ground ring. U.S. Pat. No. 8,573,995, issued on Nov. 5, 2013, discloses that such ground ring may be fabricated using, for example, a metal injection molding process and ground springs may be provided between the flex circuit and the ground ring.

China Patent No. 204315771, issued on May 6, 2015, discloses an electrical connector including an upper and lower rows of contacts respectively insert molded with an upper and lower insulative bodies and a metal sheet positioned therebetween and further insert molded with a final insulative body. The metal sheet has a supporting portion provided with a plurality of apertures for engaging corresponding bulges formed on the upper and lower insulative bodies.

SUMMARY OF THE INVENTION

An electrical connector comprises: an upper and lower terminal modules each including a plurality of terminals; a metallic plate secured between the upper and lower modules; a metallic bracket accommodating the secured metallic plate and upper and lower terminal modules; and an insulative body insert-molding the metallic bracket with the secured metallic plate and upper and lower terminal modules to form a tongue exposing the terminals of each of the upper and lower terminal modules, wherein the metallic bracket contacts the metallic plate, and the metallic bracket borders the tongue.

A method of making an electrical connector comprises the steps of: securing an upper and lower terminal modules to two opposite sides of a metallic plate, each of the upper and lower terminal modules including a plurality of terminals; accommodating the secured metallic plate and upper and lower terminal modules in a metallic bracket and making the metallic plate contact the metallic bracket; and insert molding the metallic bracket with the secured metallic plate and upper and lower terminal modules to form a tongue exposing the terminals of each terminal module.

DETAILED DESCRIPTION OF THE PREFERRED EMBODIMENT

Figure 1:
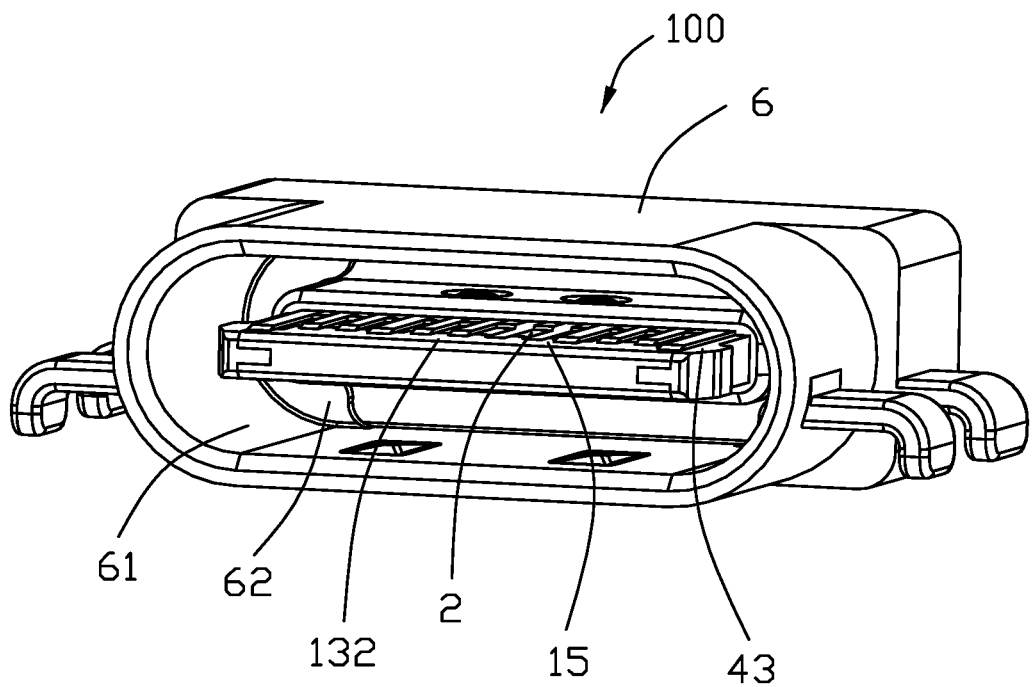
FIG. 1 is a perspective view of an electrical connector in accordance with the present invention.
Figure 2:
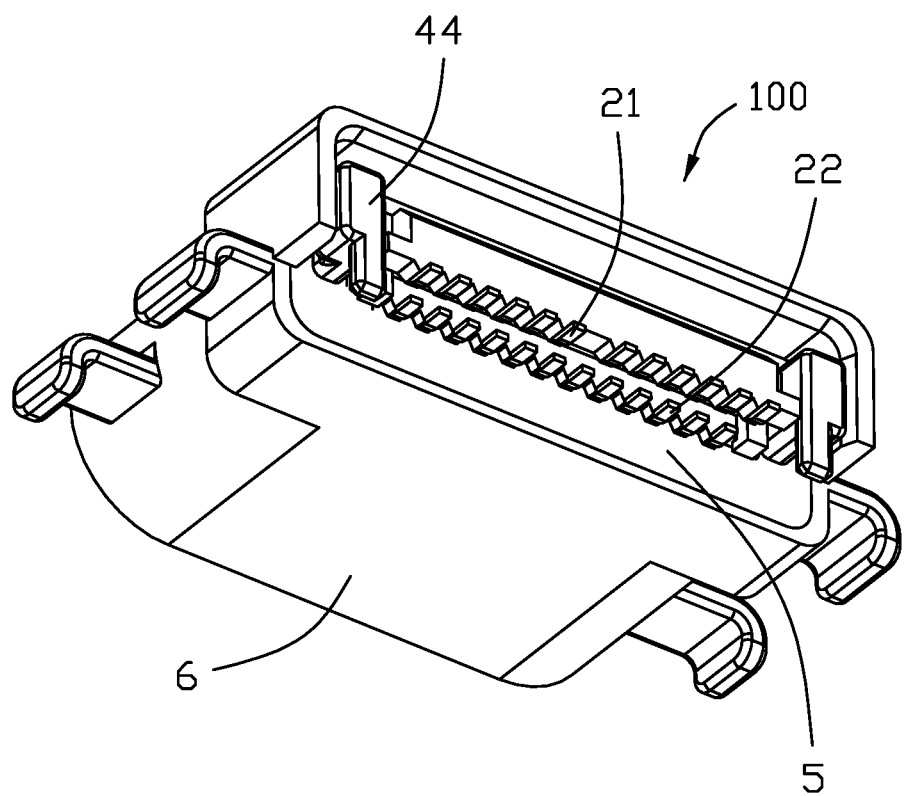
FIG. 2 is another perspective view of the electrical connector.
Figure 3:
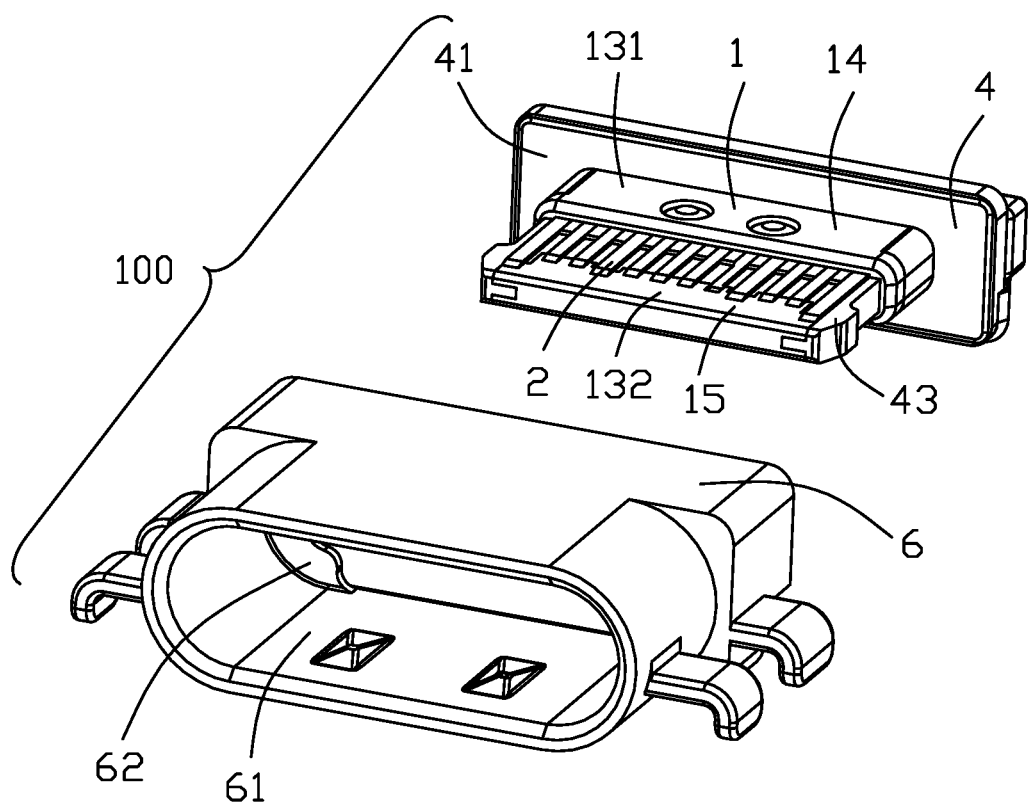
FIG. 3 is an exploded view of the electrical connector.
Figure 4:
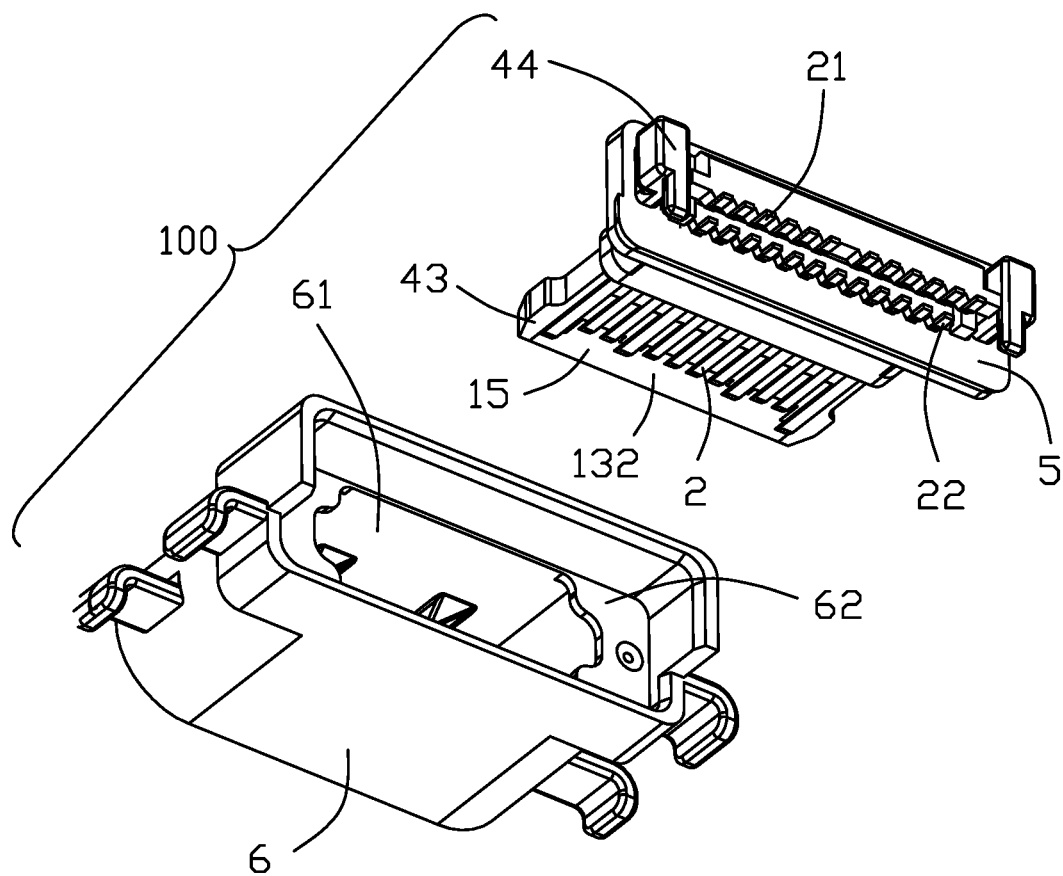
FIG. 4 is another exploded view of the electrical connector.
Figure 5:
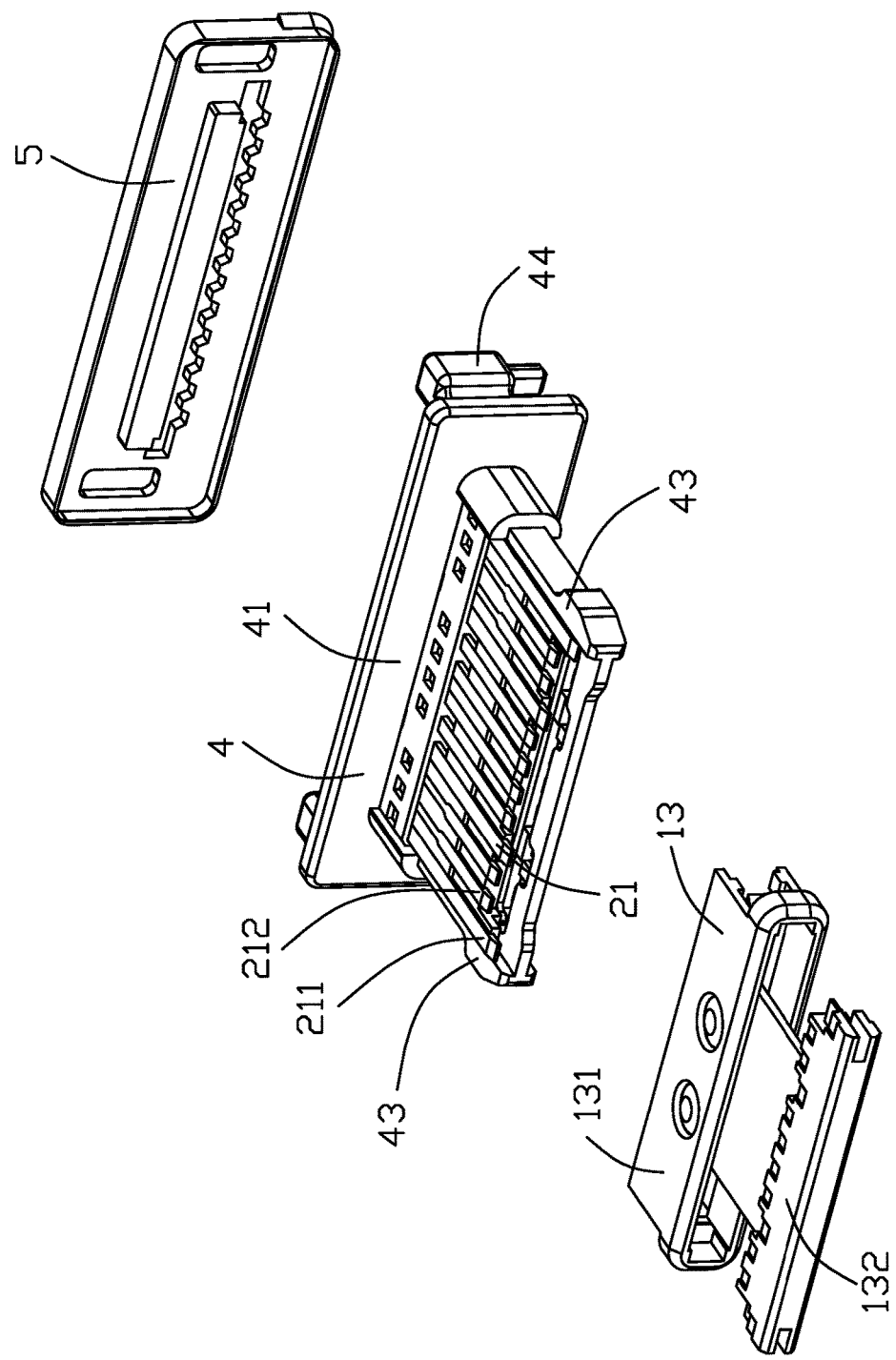
FIG. 5 is a further exploded view of FIG. 3 omitting a shielding shell of the electrical connector.
Figure 6:
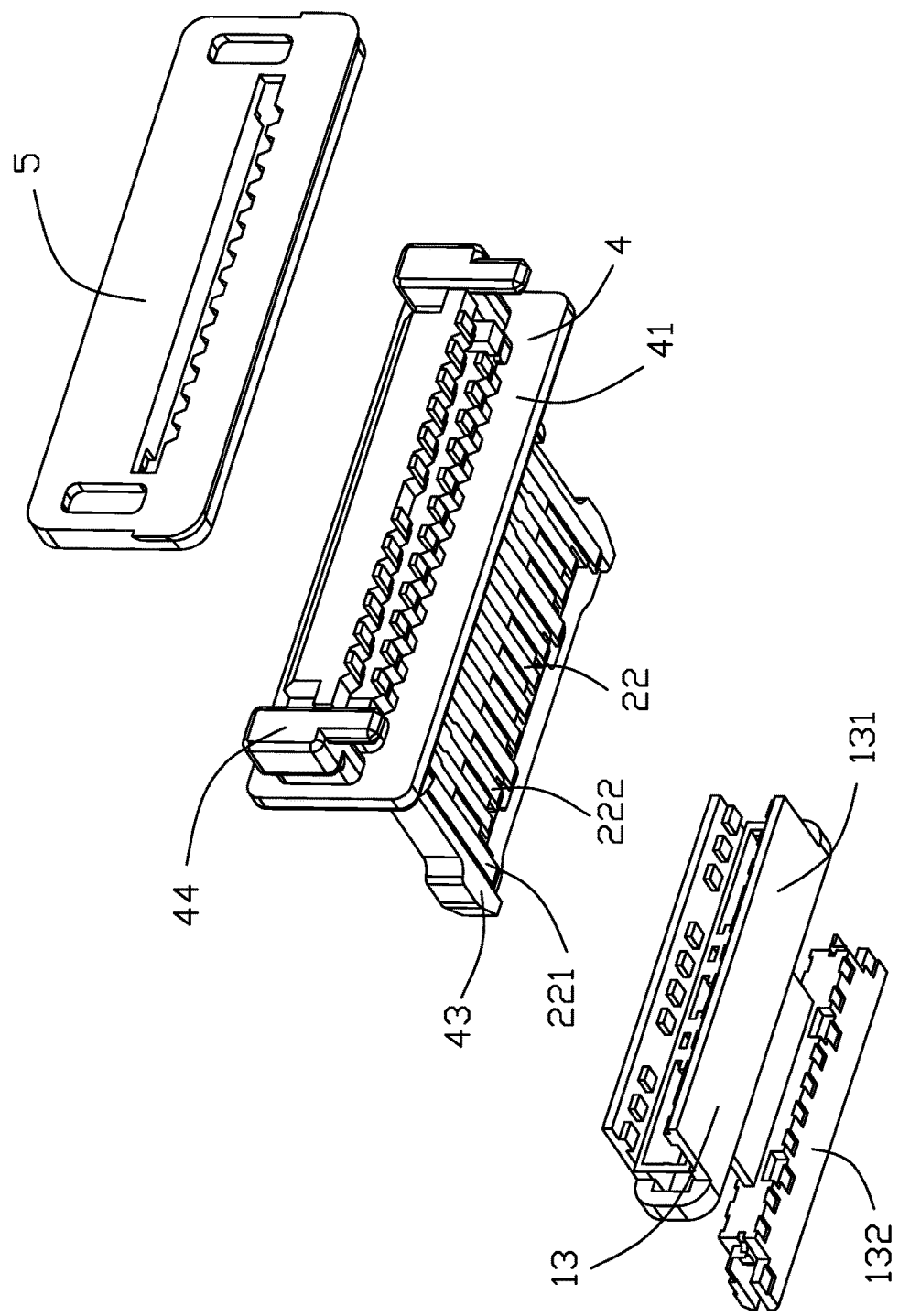
FIG. 6 is a view similar to FIG. 5 but from a different perspective.

Referring to FIGS. 1 to 15, an electrical connector 100 comprises an insulative housing 1, an upper and lower rows of contacts 2 secured in the insulative housing 1, a metallic plate 3, and a metallic bracket 4. The connector 100 further include a sealing member 5 for waterproof purpose and a shielding shell 6.

The insulative housing 1 includes an upper module part 11 and a lower module base 12 and an insulative body 13. The upper module part 11 has a base 111 and a tongue 112, the lower module part 12 has a base 121 and a tongue 122, and the insulative body 13 has a base 131 and a tongue 132. The bases 111, 121, 131 together form an overall base 14 of the insulative housing 1 and the tongues 112, 122, 132 together form an overall tongue 15 of the insulative housing 1.

The base 111 of the upper module part 11 has a front part 1111 and a rear part 1112. The rear part 1112 has a step 1114. The tongue 112 has a locking portion 1121 of generally Z-shaped to define a front receiving hole 1122 and a rear receiving hole 1123. The bottom of the upper module part 11 has another receiving hole 1113. The bottom of the tongue 112 has a pair of registering holes 1124. The base 121 of the lower module part 12 has a tail part 2111. Similarly, the tongue 122 has a locking portion 1221 of generally Z-shaped to define a front receiving hole 1222 and a rear receiving hole 1223. The top of the tongue 122 has a pair of registering holes 1224.

The upper row of contacts 21 are secured to the module part 11 and the lower row of contacts 22 are secured to the module part 12. The upper row of contacts 21 include ground contacts 211 and signal contacts 212. The lower row of contacts 22 include ground contacts 221 and signal contacts 222.

The metallic plate 3 has a main portion 31, a pair of front latches 32, a pair of notches 37, a pair of middle latches 33, a pair of detents 34, a pair of catches 35, and a pair of rear latches 36. Both the latch 32 and the detent 34 are bent upward. The latch 35 is bent downward. The main portion 31 has registering holes 311 and a pair of front heads 38.

The metallic bracket 4 made via a metal die-casting process or a metal injection molding process, includes a rear base 41 having an opening 411, a front frame 43 bordering a space 42, and a pair of mounts 44. The front frame 43 has a pair of sidebars 431 and a crossbar 432. The sidebar 431 has a protrusion 4311 for engaging a mating connector that is plugged into the connector 100. The frame 43 constitutes part of and borders the overall tongue 15 of the insulative housing 1 or the connector 100. The base 41 also constitutes part of the overall base 14 of the insulative housing 1 or the connector 100. The frame 43 has a general thickness that is greater than a thickness of the plate main portion 31.

The shielding shell 6 made via a metal die-casting process or a metal injection molding process, has an interior space 61 and a wall 62.

The connector 100 is made by the steps described as follows. The upper module part 11 and upper contacts 21 are insert molded to form an upper terminal module. A lower terminal module is similarly prepared. The upper and lower terminal modules are then secured to two opposite sides of the metallic plate 3.

In securing the upper and lower terminal modules to the metallic plate 3, firstly, the upper terminal module is engaged to an upper side of the metallic plate 3 by sliding along a first direction so that the locking portion 1121 is locked to the front latch 32 and the step 1114 engages the rear latch 36. In the meantime, the detent 34 may enter the hole 1113 in order to prevent a sliding movement (disengagement) between the plate 3 and the module from occurring.

After the upper terminal module is secured to the metallic plate 3 by sliding along a first direction, the lower terminal module is engaged to a lower side of the metallic plate 3 by sliding along a second opposite direction so that the locking portion 1221 engages the middle latch 33.

The catches 35 of the plate 3 may then be bent to hold the lower terminal module. Also the secured metallic plate 3 and upper and lower terminal modules may be accurately aligned by way of the registering holes 1124, 1224, 311 thereof. Notably, the assembled upper terminal module, the lower terminal module and the metallic plate therebetween in the vertical direction, may be deemed as a terminal subassembly.

Figure 7:
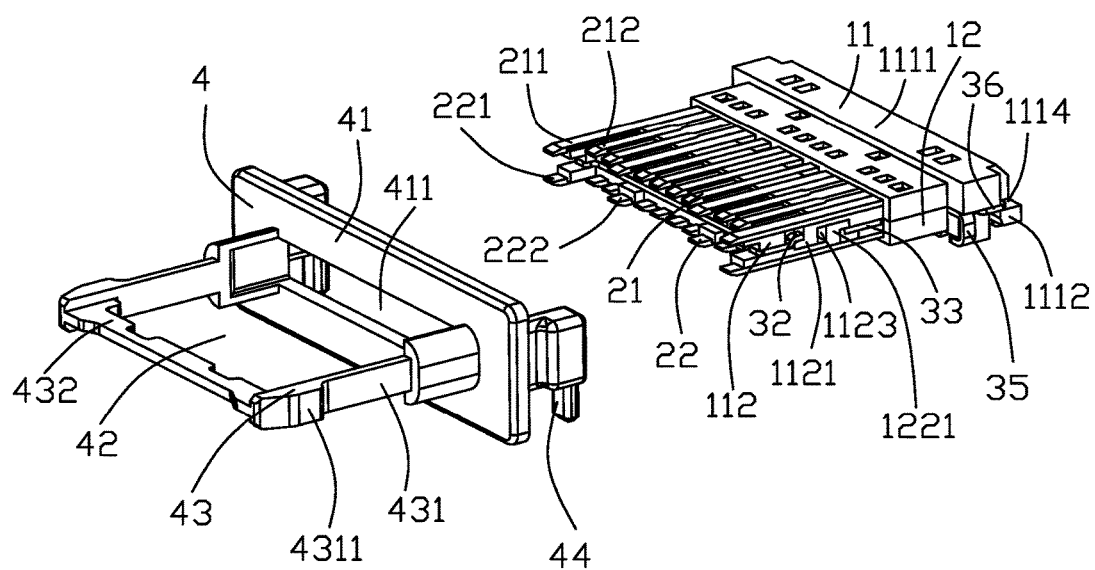
FIG. 7 is a further exploded view of FIG. 5 omitting a sealing member and an insulative body thereof.
Figure 8:
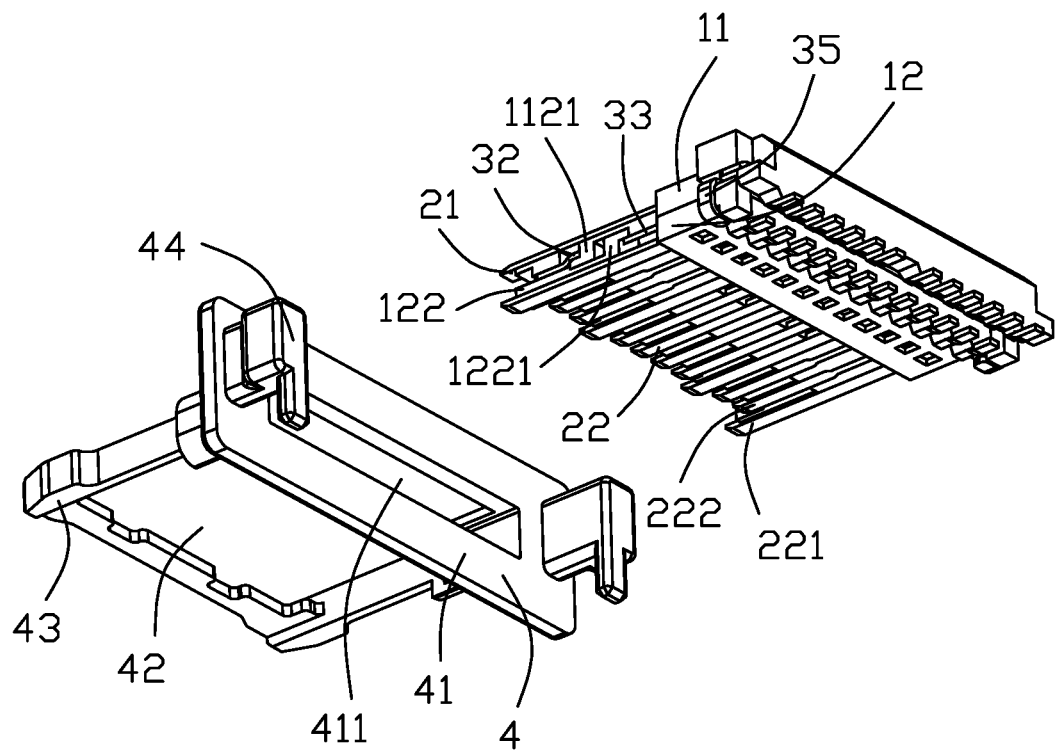
FIG. 8 is a view similar to FIG. 7 but from a different perspective.
Figure 9:
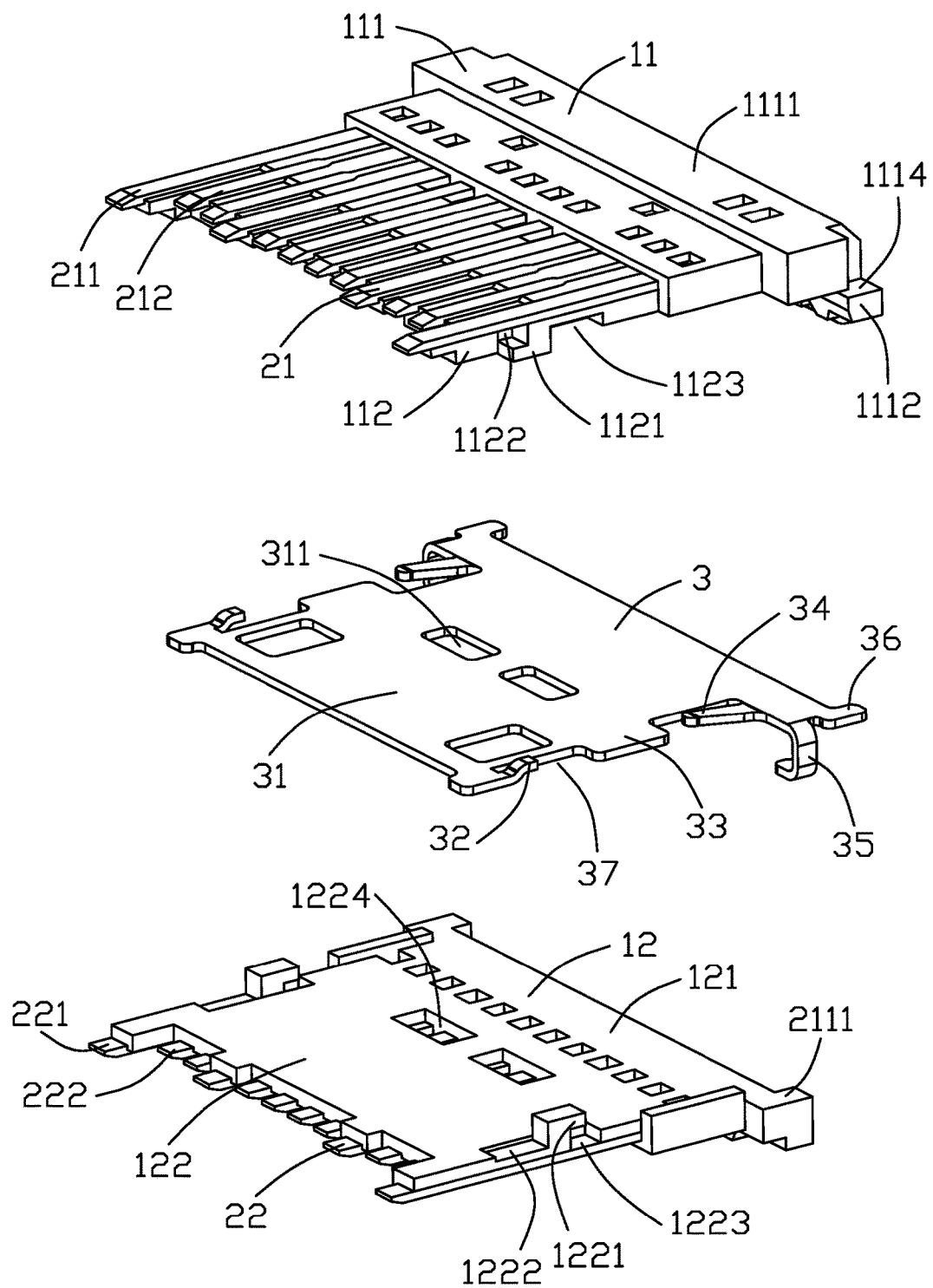
FIG. 9 is a further exploded view of FIG. 7 omitting a metallic bracket thereof.
Figure 10:
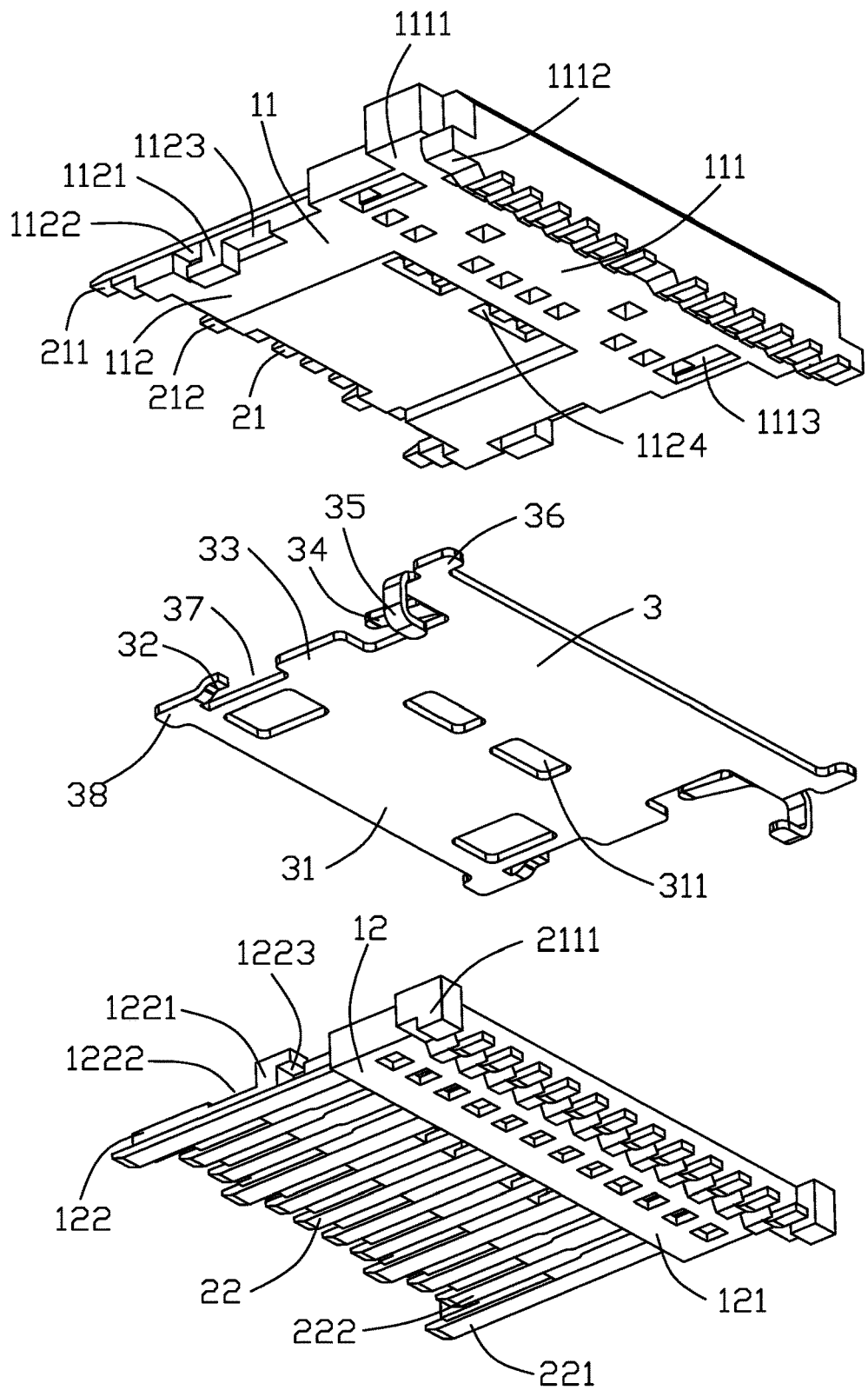
FIG. 10 is a view similar to FIG. 9 but from a different perspective.
Figure 11:
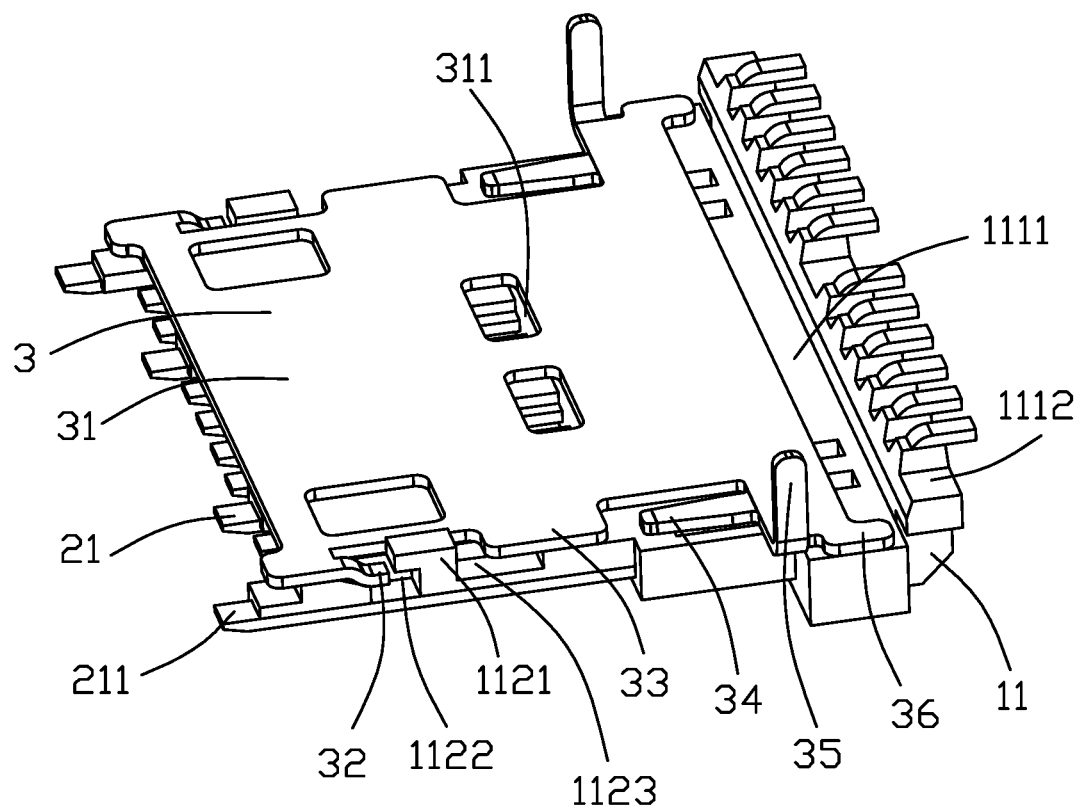
FIG. 11 shows a metallic plate and an upper terminal module part of the electrical connector prior to mounting.
Figure 12:
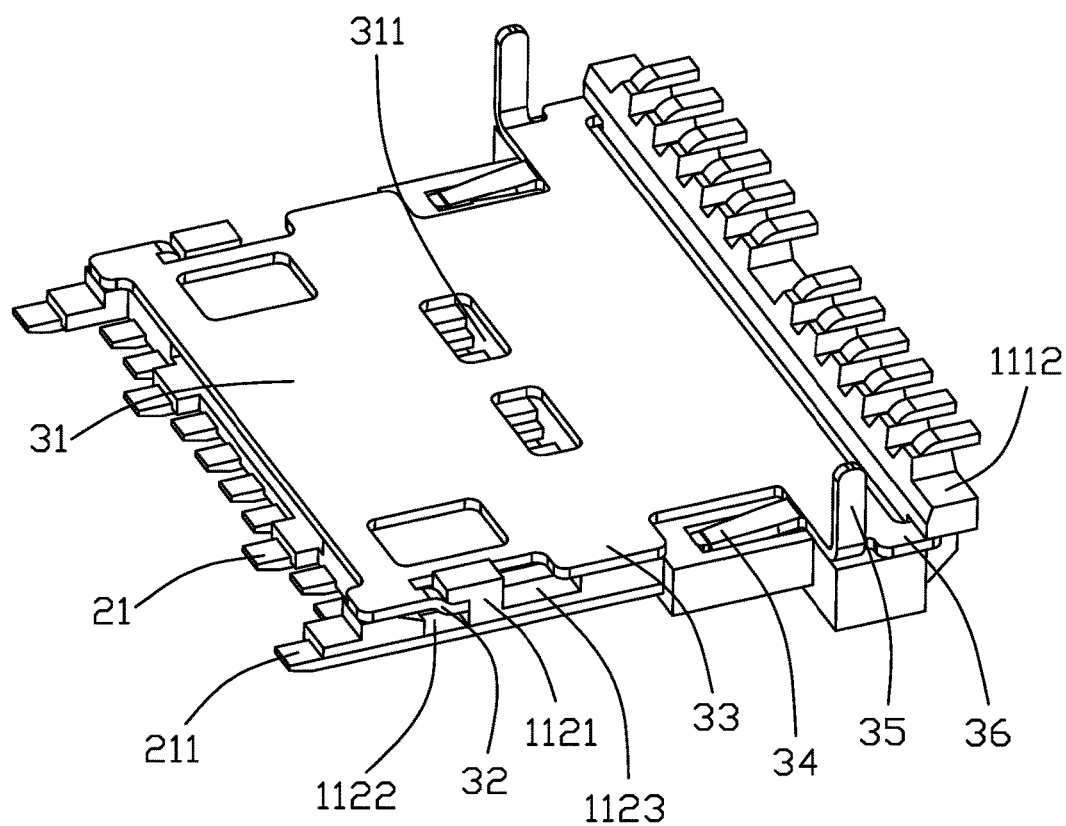
FIG. 12 is a further view of FIG. 11 showing the upper terminal module part is mounted to the metallic plate.
Figure 13:
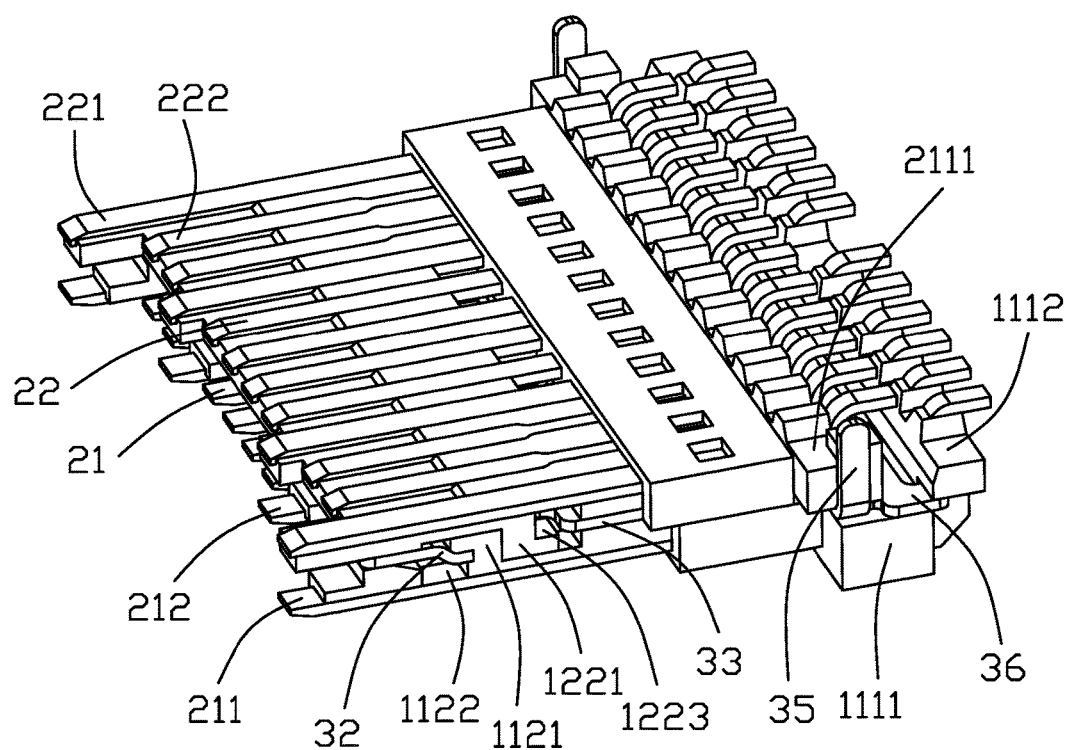
FIG. 13 is a view similar to FIG. 11 further showing a lower terminal module part of the electrical connector prior to mounting.
Figure 14:
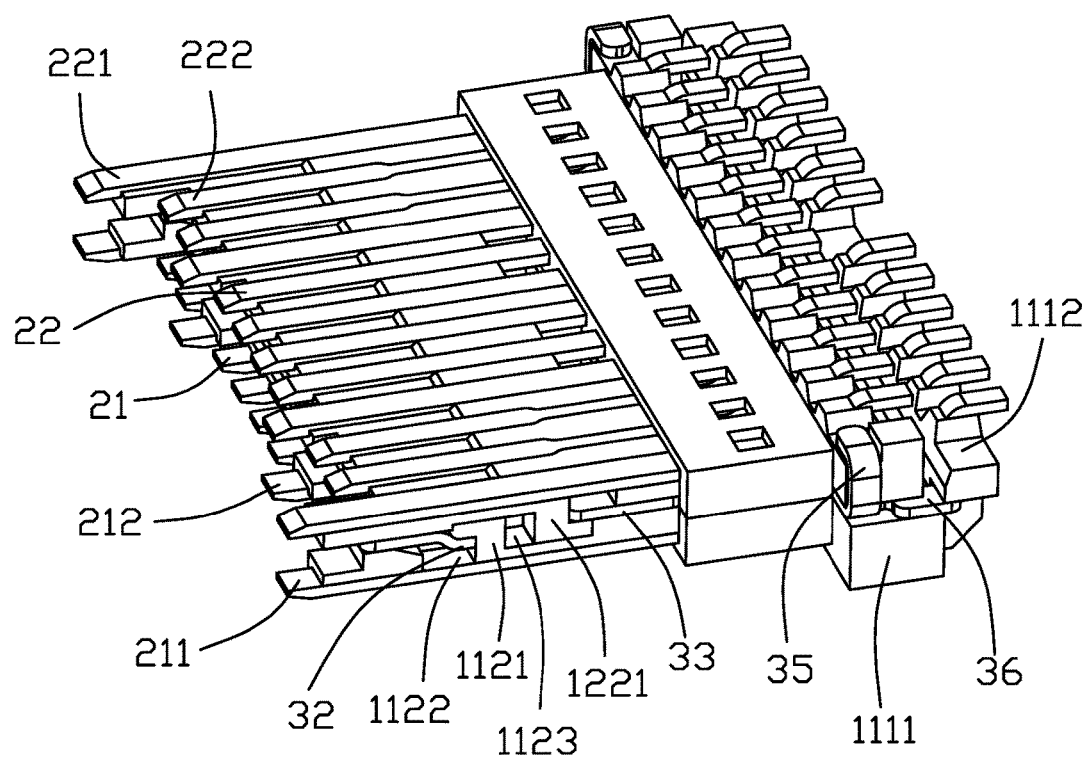
FIG. 14 is a further view of FIG. 13 showing the lower terminal module part is mounted to the metallic plate.
Figure 15:
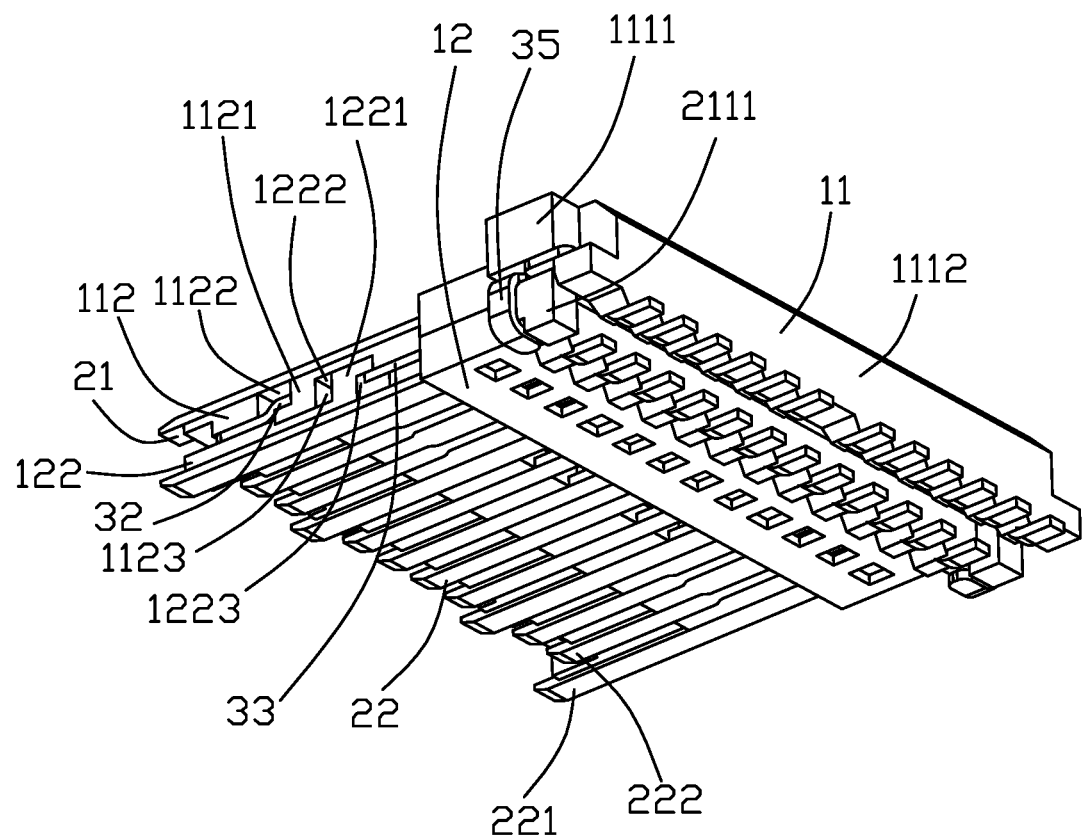
FIG. 15 is a view similar to FIG. 14 but from a different perspective.

Referring specifically to FIGS. 7 and 8, the metallic bracket 4 is to accommodate the aforementioned terminal subassembly, i.e., the secured metallic plate and upper and lower terminal modules and in so doing the metallic plate 3 may contact the metallic bracket 4 at one or more points, e.g., the front frame 43 contacting an edge of the plate main portion 31 through the front latch 32 and/or the middle latch 33, the rear base 41 contacting a front edge of the catch 35, and/or the frame crossbar 432 contacting a front of the plate through the head 38.

Thereafter, the metallic bracket together with the metallic plate and upper and lower terminal modules mounted to the metallic bracket is further insert-molded or over-molded to form the overall tongue 15 exposing the terminals 2 of each terminal module, as well as to form the overall base 14. Generally speaking, in the terminal subassembly, the metallic plate extends in a horizontal plane defined by the front-to-back direction and the transverse direction, and the upper terminal module is assembled upon the top surface of the metallic plate along a horizontal direction, and the lower terminal module is assembled upon the bottom surface of the metallic plate along another horizontal direction so as to assure securement therebetween in the vertical direction perpendicular to the horizontal plane for resisting the high pressure during the insert-molding (over-molding) process between the terminal subassembly and the metallic bracket. Notably, the front frame of the metallic bracket forms a pair of locking notches at two opposite lateral sides and defines a height in the vertical direction which is essentially same with the thickness of the tongue in the vertical direction, thus reinforcing the total structural strength of the tongue. Furthermore, the metal injection molding bracket 4 cooperating with the metal injection molding shielding shell 6 may provide superior structural strength of the whole connector during operation.

The aforementioned/obtained sub-unit may be further processed by mounting it to the shielding shell 6. The proper positioning is assured by the wall 62 stopping the base 41.

The sealing member 6 may optionally be applied to the space 61.

From the above, it is understood that a sub-assembly of the firmly secured and accurately registered metallic plate and upper and lower terminal modules makes it efficient and effective to subsequently perform a second insert molding process on the sub-assembly and the metallic bracket.

What is claimed is:

1. An electrical connector comprising:
   an upper and lower terminal modules each including a plurality of terminals;
   a metallic plate secured between the upper and lower modules;
   a metallic bracket accommodating the secured metallic plate and upper and lower terminal modules; and
   an insulative body insert-molding the metallic bracket with the secured metallic plate and upper and lower terminal modules to form a tongue exposing the terminals of each of the upper and lower terminal modules; wherein
   the metallic bracket contacts the metallic plate;
   the metallic bracket borders the tongue; and
   the metallic bracket comprises a rear base and a front frame, the front frame having a crossbar, and the metallic plate has a catch contacting the rear base and a front head contacting the crossbar.

2. The electrical connector as claimed in claim 1, wherein:
   the metallic plate has a front latch and a rear latch; and
   the upper terminal module has a locking portion and a step slidably engaging the front latch and the rear latch, respectively.

3. The electrical connector as claimed in claim 2, wherein the metallic plate has a detent and the upper terminal module has a hole engaging the detent to prevent a sliding movement between the metallic plate and the upper terminal module.

4. The electrical connector as claimed in claim 2, wherein the metallic bracket comprises a frame contacting the front latch.

5. The electrical connector as claimed in claim 1, wherein the metallic plate has a middle latch, and the lower terminal module has a locking portion engaging the middle latch.

6. The electrical connector as claimed in claim 5, wherein the metallic plate has a catch holding the lower terminal module.

7. The electrical connector as claimed in claim 5, wherein the metallic bracket comprises a frame contacting the middle latch.

8. The electrical connector as claimed in claim 1, wherein the metallic bracket is fabricated using a metal injection molding process.

9. The electrical connector as claimed in claim 1, wherein the metallic bracket comprises a base having an opening and a frame bordering a space, the opening and the space receiving the secured metallic plate and upper and lower terminal modules.

10. The electrical connector as claimed in claim 1, further comprising a shielding shell accommodating the metallic bracket.

11. A method of making an electrical connector, comprising the sequential steps of:
    securing an upper and lower terminal modules to two opposite sides of a metallic plate, each of the upper and lower terminal modules including a plurality of terminals;
    accommodating the secured metallic plate and upper and lower terminal modules in a metallic bracket and making the metallic plate contact the metallic bracket; and
    insert molding the metallic bracket accommodated with the secured metallic plate and upper and lower terminal modules with an insulative body to form a tongue exposing the terminals of each terminal module.

12. The method as claimed in claim 11, wherein the step of securing comprises engaging the upper terminal module to the metallic plate along a first direction and engaging the lower terminal module to the metallic plate along a second direction opposite to the first direction.

13. The method as claimed in claim 11, further comprising a step of mounting a shielding shell to the insert molded metallic bracket and secured metallic plate and upper and lower terminal modules.

14. The method as claimed in claim 11, wherein the metallic bracket is made via a metal injection molding process, and includes a rear base and a front frame perpendicular to each other, and said front frame defines a boarder of said tongue.

15. An electrical connector comprising:
    a terminal subassembly including:
    a metallic shield extending in a horizontal plane defined by a front-to-back direction and a transverse direction perpendicular to each other, and defines opposite top and bottom surfaces thereon in a vertical direction perpendicular to said horizontal plane;
    an upper terminal module including a plurality of upper terminals integrally formed with an insulative upper module part via an insert-molding process;
    a lower terminal module including a plurality of lower terminals integrally formed with an insulative lower module part via another insert-molding process; and
    first means for assembling the upper terminal module upon the top surface along a horizontal direction, and second means for assembling the lower terminal module upon the bottom surface along another horizontal direction so as to commonly form a terminal subassembly for further over-molding, wherein
    said horizontal direction is opposite to said another horizontal direction.

16. The electrical connector as claimed in claim 15, further comprising a metallic bracket including a front frame and a rear base perpendicular to each other, and wherein the front frame includes a pair of sidebars and a crossbar linked therebetween at corresponding front ends along the transverse direction, and the side bars are thicker than the crossbar in the vertical direction and are equipped with corresponding locking notches.

17. The electrical connector as claimed in claim 15, further comprising a metallic bracket, and wherein said metallic plate is electrically and mechanically connected to the metallic bracket.

18. The electrical connector as claimed in claim 15, wherein said first means is located on both a front position and a rear position of the upper terminal module in the front-to-back direction, and said second means is located on both a front location and a rear location of the lower terminal module in the front-to-back direction.

19. An electrical connector comprising:
    an upper and lower terminal modules each including a plurality of terminals;
    a metallic plate secured between the upper and lower modules;
    a metallic bracket accommodating the secured metallic plate and upper and lower terminal modules; and
    an insulative body insert-molding the metallic bracket with the secured metallic plate and upper and lower terminal modules to form a tongue exposing the terminals of each of the upper and lower terminal modules, wherein
    the metallic bracket contacts the metallic plate,
    the metallic bracket borders the tongue,
    the metallic plate has a front latch and a rear latch,
    the upper terminal module has a locking portion and a step slidably engaging the front latch and the rear latch, respectively, and
    the metallic bracket comprises a frame contacting the front latch.

20. The electrical connector as claimed in claim 19, further comprising a shielding shell accommodating the metallic bracket.

* * * * *